(12) United States Patent
Ritts et al.

(10) Patent No.: US 8,589,142 B2
(45) Date of Patent: Nov. 19, 2013

(54) VISUAL DEBUGGING SYSTEM FOR 3D USER INTERFACE PROGRAM

(75) Inventors: James Ritts, Emeryville, CA (US); Baback Elmieh, Carlsbad, CA (US); David L Durnil, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 1467 days.

(21) Appl. No.: 11/478,418

(22) Filed: Jun. 28, 2006

(65) Prior Publication Data

US 2007/0225961 A1 Sep. 27, 2007

Related U.S. Application Data

(60) Provisional application No. 60/696,345, filed on Jun. 29, 2005.

(51) Int. Cl.
*G06F 9/455* (2006.01)

(52) U.S. Cl.
USPC .......................................... 703/24

(58) Field of Classification Search
USPC .................................... 703/21, 24
See application file for complete search history.

(56) References Cited

U.S. PATENT DOCUMENTS

| | | | |
|---|---|---|---|
| 5,913,052 A | 6/1999 | Beatty et al. | |
| 6,514,142 B1 | 2/2003 | Hattori | |
| 6,778,190 B1* | 8/2004 | Nishiumi et al. | 345/619 |
| 2001/0027387 A1 | 10/2001 | Miyake et al. | |
| 2002/0038168 A1 | 3/2002 | Kasuga et al. | |
| 2002/0169591 A1* | 11/2002 | Ryzl | 703/24 |
| 2003/0236657 A1* | 12/2003 | Ryzl | 703/23 |
| 2004/0150626 A1* | 8/2004 | Husman et al. | 345/173 |
| 2005/0130744 A1* | 6/2005 | Eck et al. | 463/43 |
| 2006/0048006 A1* | 3/2006 | Lou | 714/25 |

FOREIGN PATENT DOCUMENTS

| | | |
|---|---|---|
| EP | 0895196 A1 | 2/1999 |
| EP | 0896277 | 10/1999 |
| JP | 10033145 A | 2/1998 |
| JP | 2000040169 A | 2/2000 |
| JP | 2000112886 A | 4/2000 |
| JP | 2001353678 A | 12/2001 |

(Continued)

OTHER PUBLICATIONS

Ken Davis, "BREW SDK & Development Tools Overview", Jun. 2, 2005, BREW Conference 2005, pp. 1-57.*

(Continued)

*Primary Examiner* — Kamini S Shah
*Assistant Examiner* — Russ Guill
(74) *Attorney, Agent, or Firm* — Timothy F. Loomis; James R. Gambale, Jr.

(57) ABSTRACT

In one embodiment, apparatus are provided, including an embedded device simulation engine, an application run controller, and a status provider. The embedded device simulation engine is provided to simulate, on a computer platform other than a target embedded device, a 3D application authored for the target embedded device. The application run controller is provided to control the manner in which the 3D application is run in the embedded device simulation engine. The status provider is provided to provide, as the 3D application is run in the simulated environment of the embedded device simulation engine, information regarding statuses of 3D icons in the scene or scenes of the 3D application, of animations defined of the 3D icons in the 3D application, and of events occurring that affect the 3D application.

18 Claims, 4 Drawing Sheets

(56) References Cited

FOREIGN PATENT DOCUMENTS

| JP | 2002049927 A | 2/2002 |
| JP | 2005095387 A | 4/2005 |
| JP | 2005165873 A | 6/2005 |
| KR | 1020020035561 | 11/2002 |
| WO | WO9833145 A1 | 7/1998 |
| WO | 9954820 | 10/1999 |
| WO | WO0105162 | 1/2001 |

OTHER PUBLICATIONS

Qualcomm, "Starting With BREW", 2004, Qualcomm Inc, pp. 1-86.*

Qusay H. Mahmoud, "Getting Started With the Mobile 3D Graphics API for J2ME", Sep. 21, 2004, http://developers.sun.com/mobility/apis/articles/3dgraphics/, pp. 1-16.*

Brooks Wang, "BREW SDK Overview", Oct. 26, 2005, BREW Conference 2005, 96 unnumbered pages.*

Peter C. Litwinowicz, "Inkwell: A 2 ½-D Animation System", 1991, Computer Graphics, vol. 25, No. 4, pp. 113-122.*

Alexander Langer, "Simple Animation", Jan. 4, 2005, LinuxFocus article 347, retrieved from the internet at http://mercury.chem.pitt.edu/~sasha/LinuxFocus/English/Archives/lf-2004_09-0347.pdf, five unnumbered pages.*

F.J. Rammig, "Beyond VHDL: textual formalisms, visual techniques, or both?", 1996, Design Automation Conference Proceedings of EURO-DAC, pp. 420-427.*

International Search Report—PCT/US2006/026209, International Search Authority—European Patent Office—Feb. 16, 2007.

Written Opinion—PCT/US2006/026209, International Search Authority—European Patent Office—Feb. 16, 2007.

International Preliminary Report on Patentability—PCT/US2006/026209, International Bureau of WIPO—Geneva Switzerland—Jan. 9, 2008.

Taiwan Search Report—TW095123580—TIPO, Mar. 6, 2010.

"Maikon Basic Magazine", Get a development tool for free! Comparison of programming by Palm vs Pocket PC, written by Takuya Matsubara, published from Dempa Shinbunsha, May 1, 2003, vol. 22, No. 5, pp. 30-35.

"Basis of 3D Model Drawing," C Magazine, Softbank Publishing Corp., Sep. 1, 2000, vol. 12, No. 9, pp. 10-15.

* cited by examiner

VISUAL DEBUGGING SYSTEM FOR 3D USER INTERFACE PROGRAM

CROSS REFERENCE TO RELATED APPLICATIONS

Priority is hereby claimed to U.S. Provisional Patent Application No. 60/696,345.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

Aspects of the present disclosure relate to tools and features to facilitate the development and implementation of 3D content used in embedded devices. The embedded devices may be mobile devices that capture, receive, and/or transmit voice, data, text, and/or images. Other aspects of the present disclosure relate to tools and features to facilitate the debugging of 3D graphical user interface programs for such devices.

BACKGROUND OF THE DISCLOSURE

Various application development platforms (e.g., the BREW™ platform) have been created and marketed that allow users to author programs for ultimate export to target embedded devices such as mobile phones. Software exists (e.g., the BREW™ Simulator) for simulating the execution of these programs on a generic computer platform before exporting the program to the target embedded device.

SUMMARY OF THE DISCLOSURE

Apparatus are provided including an embedded device simulation engine to simulate, on a computer platform other than a target embedded device, a 3D application authored for the target embedded device. In addition to the embedded device simulation engine, an application run controller is provided to control the manner in which the application is run in the embedded device simulation engine. A status provider is also provided to provide, as the 3D application is run in the simulated environment of the embedded device simulation engine, information regarding statuses of 3D icons in a scene of the 3D application, of animations defined in the 3D application, and of events occurring that affect the 3D application.

BRIEF DESCRIPTION OF THE DRAWINGS

Non-limiting example embodiments of the disclosure are further described in the detailed description, which follows, by reference to the noted drawings, in which like reference numerals represents similar parts throughout the several views of the drawings, and wherein.

DETAILED DESCRIPTION

Figure 1:
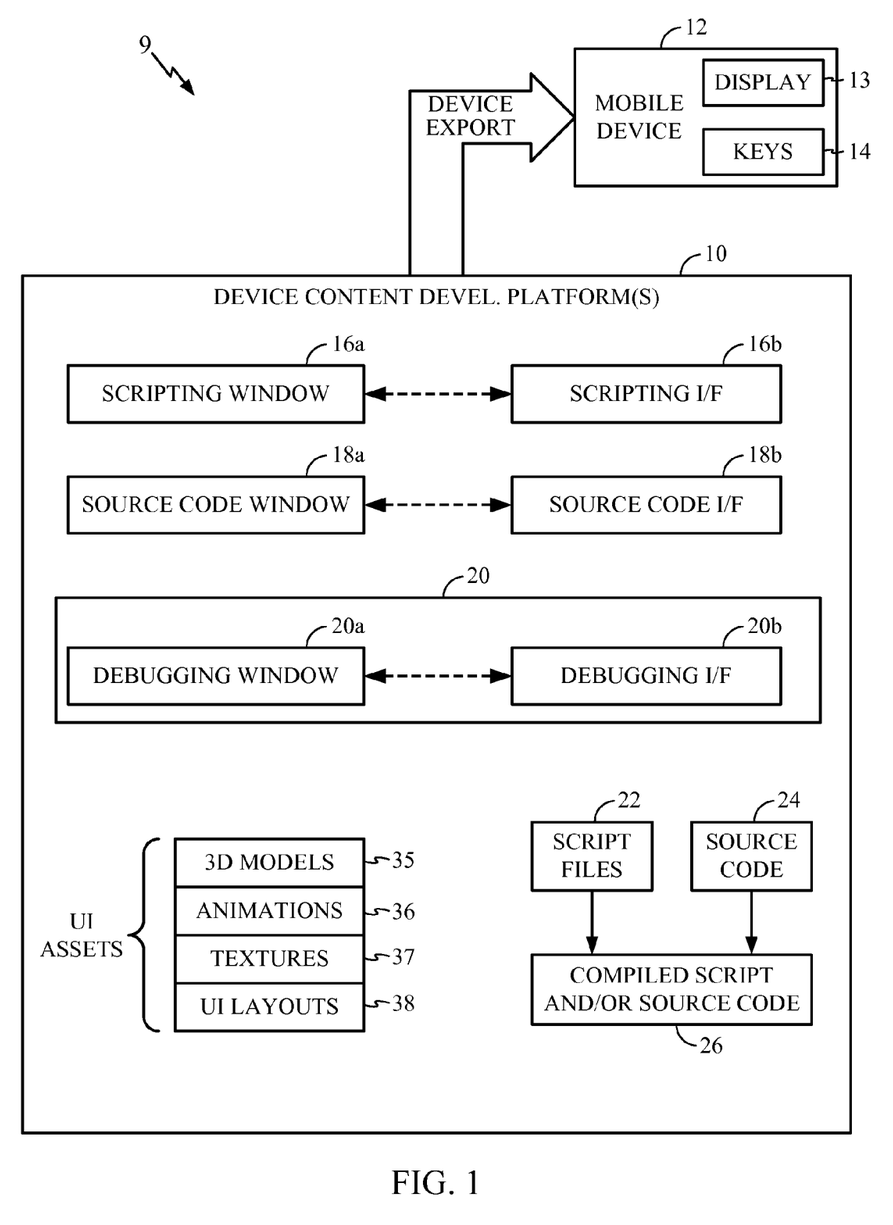
FIG. 1 is a block diagram of one or more device content development platforms.

Referring now to the drawings in greater detail, FIG. 1 illustrates a 3D content development system 9. The illustrated system 9 includes one or more device content development platforms 10, and a mobile device 12

Mobile device 12 may, for example, be a mobile phone. The illustrated mobile device 12 is an embedded device, which captures, receives, and/or transmits voice, data, text, and/or images. The illustrated mobile device 12 further includes a display 13 and keys 14, to allow the control of mobile device 12 and the input of information into mobile device 12.

The illustrated device content development platform(s) 10 may be a single platform, a distributed platform, or multiple individual platforms. The illustrated platform(s) includes a number of software interfaces which interact with and provide corresponding windows or screens on a computer platform. Each of these software interfaces includes software running on a computer platform. These interfaces and windows include a scripting window 16a and a corresponding scripting language interface 16b. A source code window 18a is provided which corresponds to a source code interface 18b. A debugging system 20 is provided. The debugging system 20 includes a debugging window 20a which corresponds to a debugging interface 20b.

The illustrated 3D content development system 9 may be tailored to a system for developing and implementing 3D user interfaces for use on the embedded device. More specifically, the 3D user interface may cause the display of a 3D graphical virtual interface that graphically portrays (on display 13 of mobile device 12) and simulates a physical device with its interface components, and therefore, serves as a 3 dimensional (3D) user interface, with icons embedded therein.

Scripting language interface 16b is coupled to, and generates, one or more script files 22, which cater to the building of 3D user interfaces. Specifically, those script files 22 provide information for 3D icon and scene definition as well as for programming the animation of the defined 3D icons and scenes. The 3D icons and scenes, as animated, are tied to or associated with mobile device 12, and tools thereof, to control or input and/or to display or output various mobile device operations, settings, events, and/or statuses.

Each of the illustrated interfaces 16b, 18b, and 20b is operable through the use of its corresponding window for receiving controls and information via a computer screen and, for displaying information to the user via the same computer screen.

Source code interface 18b, in connection with the source code window 18a, allows for the creation of a program using source code, typically using commands provided in code provided for original equipment manufacturers (OEMs).

Debugging interface 20b, interacting with debugging window 20a, facilitates the simulation of script files 22 for purposes of checking and debugging the script file. More specifically, the debugging interface 20b may provide, via a computer screen display on debugging window 20a, information regarding statuses of 3D icons in a scene or in scenes of a given 3D application. The debugging interface may further provide on the debugging window 20a information regarding statuses of animations defined in the 3D application, and of the events occurring that affect the 3D application.

Scripting language interface 16b produces script files 22, while source code interface 18b produces source code 24. Either or each of these types of code may be compiled to produce compiled script and/or source code 26. The illustrated device content development platform(s) 10 further includes user interface (UI) assets as well as user interface layout files. These include 3D model files 35, animation files 36, texture files 37, and user interface (UI) layout files 38.

A graphics engine layer of a mobile device controls 3D graphical functions on mobile device 12 in accordance with the compiled script and/or source code 26 in connection with any associated UI assets and UI layout files, as stored in files 35, 36, 37, and 38.

Figure 2:
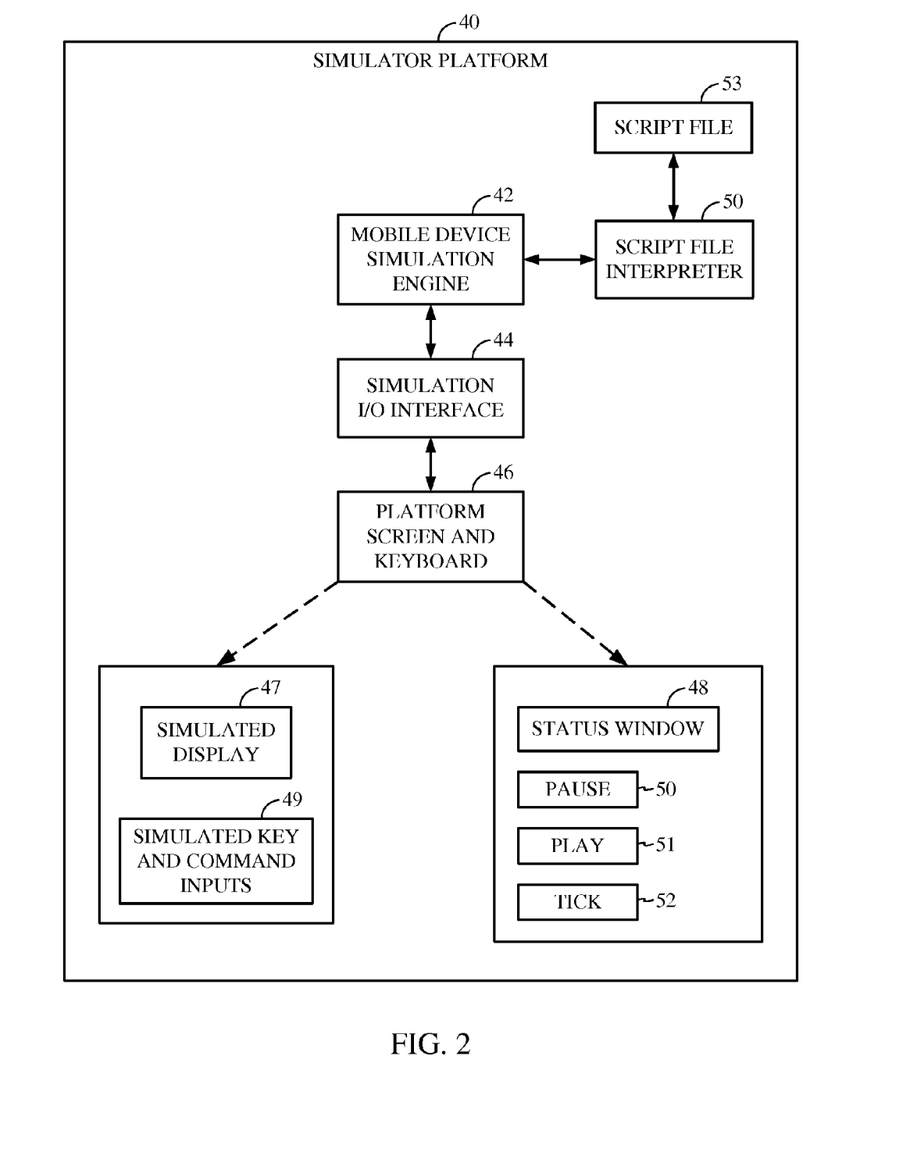
FIG. 2 is a schematic block diagram of a simulator platform.

Debugging system 20 may be implemented in the form of a simulator platform 40 as shown in FIG. 2. The illustrated simulator platform 40 includes a mobile device simulation engine 42, a simulation input/output interface 44, and a platform screen and keyboard 46. The illustrated platform 40 further includes a script file 53 to be debugged, and a script file interpreter 50. The script file interpreter 50 interprets script file 53 so that it can be simulated by mobile device simulation engine 42.

The illustrated platform screen and keyboard 46 causes the simulated display 47 of the screen of the simulated mobile device, and provides the ability to receive certain simulated key and command inputs 49 via the either or both of the platform screen and keyboard 46.

In addition, platform screen and keyboard 46 display a status window 48, and provide, through either computer screen icons or buttons, or through the use of physical control switches or inputs, including, for example certain keys on the keyboard, pause 50, play 51, and tick 52 controls.

Status window 48 provides information to the user as the application is run in a simulated environment of mobile device simulation engine 42. The information that is provided is information regarding statuses of 3D icons in the scene or scenes of the 3D application, of animations defined in the 3D application, and of events occurring that affect the 3D application.

A fine-tune mechanism may be provided to allow fine-tuning (i.e., modification) of portions of the 3D application, by allowing a user to change the script. This mechanism may be provided as part of simulator platform 40, or the user may use the scripting interface 16b of the device content development platform 10. Such fine-tuning of the 3D application may include defining animations of the 3D application, and/or defining interaction flow of the 3D application, including interaction flow of the icons in the 3D user interface.

The illustrated status window 48 provides, i.e., displays to a user via a computer screen, extensive information describing statuses of all or a subset of icons in the 3D user interface, all or a subset of animations of objects in the scene, and all or a subset of events. Events occur external to the 3D application. For example, an event may be a state change of the simulated target device, or an event may result from user interaction with the 3D application, either by manipulation of a 3D icon or by the use of device keys in the simulated target device. Examples of events include the statuses of the target device itself, including a command key or a given key being depressed, or a state change in the device, such as, a GPS signal being detected, or a low battery state in the target device.

Figure 3:
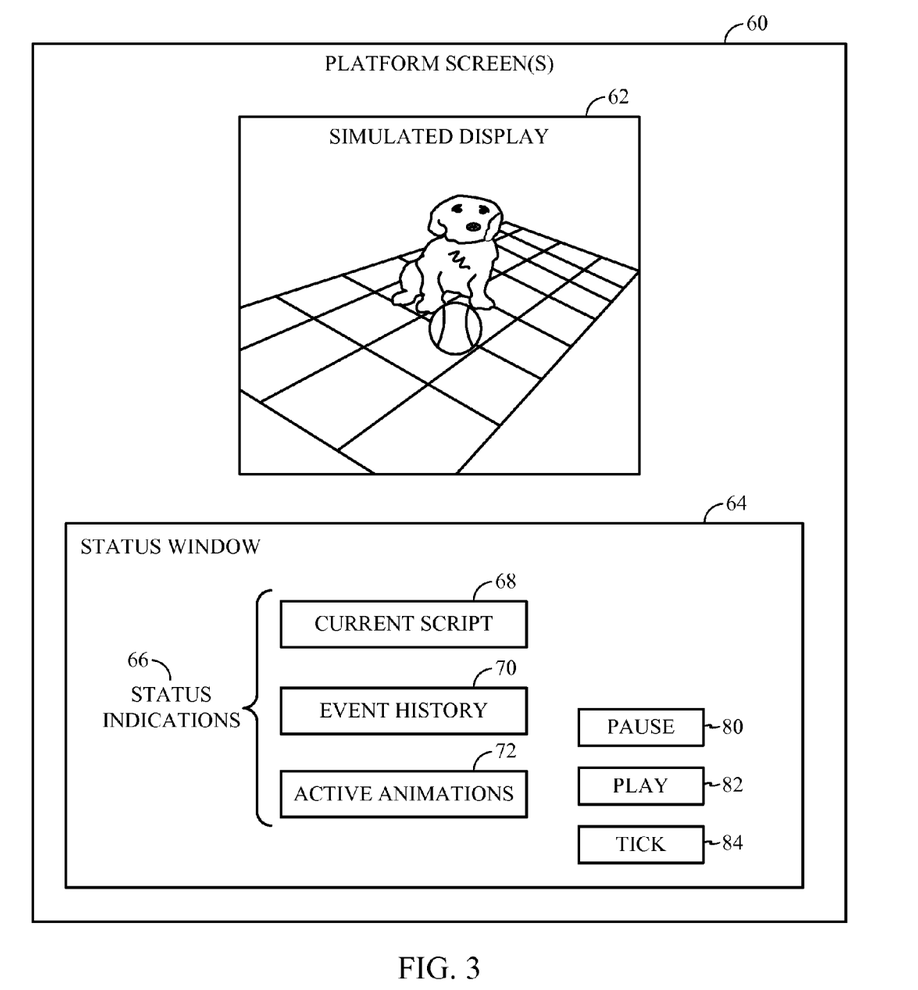
FIG. 3 is a schematic diagram of one or more platform screens.

FIG. 3 shows a schematic diagram of one or more platform screens of simulator platform 40. The illustrated screen(s) 60 include a simulated display 62 and a status window 64. The simulated display 62 presents the 3D user interface being implemented by the 3D application through the use of mobile device simulation engine 42, running the script in script file 53 as interpreted by script file interpreter 50. The example scene depicted in simulator display 62 includes a default ambient lighting and a single camera view showing a puppy and a ball on a checkered floor.

Status window 64 includes a number of status indications 66. Status indications 66 may, for example, be graphical or textual indications on status window 64 of certain information. Those status indications include, in the embodiment shown in FIG. 3, a current script status indication 68, an event history status indication 70, and active animations status indication 72. Other examples not shown in FIG. 3 include an icons status indication, a camera status indication, and a light status indication.

In the illustrated embodiment, the current script status indication 68 portrays, via status window 64, the following the types of script information: an indication of the current state of the animation run controller, represented by the numerical identity of the current animation state within the animation state machine.

In this embodiment, event history status indication 70 portrays, via the status window 64, the following types of event history information: a listing of recent events pertinent to the animation, which may include key input notifications, and the starting or ending of individual animation loops.

In this embodiment, active animations status indication 72 portrays, via status window 64, the following types of active animation information: for each currently running animation being applied to the scene, to a camera, to a light, or to an icon, an indication is given of the total length of the animation, the subset of the total length being run, and the position of the animation being currently displayed from within that subset.

While a single status window 64 is depicted in the illustrated schematic of the platform screen or screens 60, separate status windows may be provided or accessible for one or more portions of the information depicted in the illustrated status window 64. For example, current script status indication information 68 may be depicted in one window, while event history status indication 70 may be depicted in a separate window.

The status window 64 further includes graphical tools for allowing a user to activate or deactivate a pause switch 80, a play switch 82, and a tick switch 84. These graphical tools may, for example, be graphical buttons provided on a computer screen within status window 64. The pause switch 80 causes the 3D application to pause at a particular point in its playback, thereby allowing the status information in each of the status indications 66 to portray information relevant to that particular point within the 3D application. The play switch 82 causes the 3D application to be run, or to resume from, a pause state. The tick switch 84 can be depressed to cause the application to move from one increment to another in its execution. In other words, the tick switch is provided to step through each of the increments in running the script. The increments may include individual consecutive frames of animations of icons currently be displayed in the scene on the simulated screen.

Generally, the status indications 66 monitor, and accordingly portray, via a screen, status information for each of the 3D icons in the scene or scenes of the 3D application. Status information is provided for each of the frames of animations of the objects in the scene. The objects may include one or more lights, one or more 3D icons, a targeted direction or directions of individual lights, one or more cameras, and targeted directions of the each of the cameras. The status information may further include the position of each of the lights, icons, light target positions, cameras, and camera target positions in the scene including whether such object or location is obstructed or has collided with another object, and whether or not a particular object is active or inactive. For example, a light or a camera may be provided for within the script but may be active or inactive at a given point within the execution of the 3D application.

Figure 4:
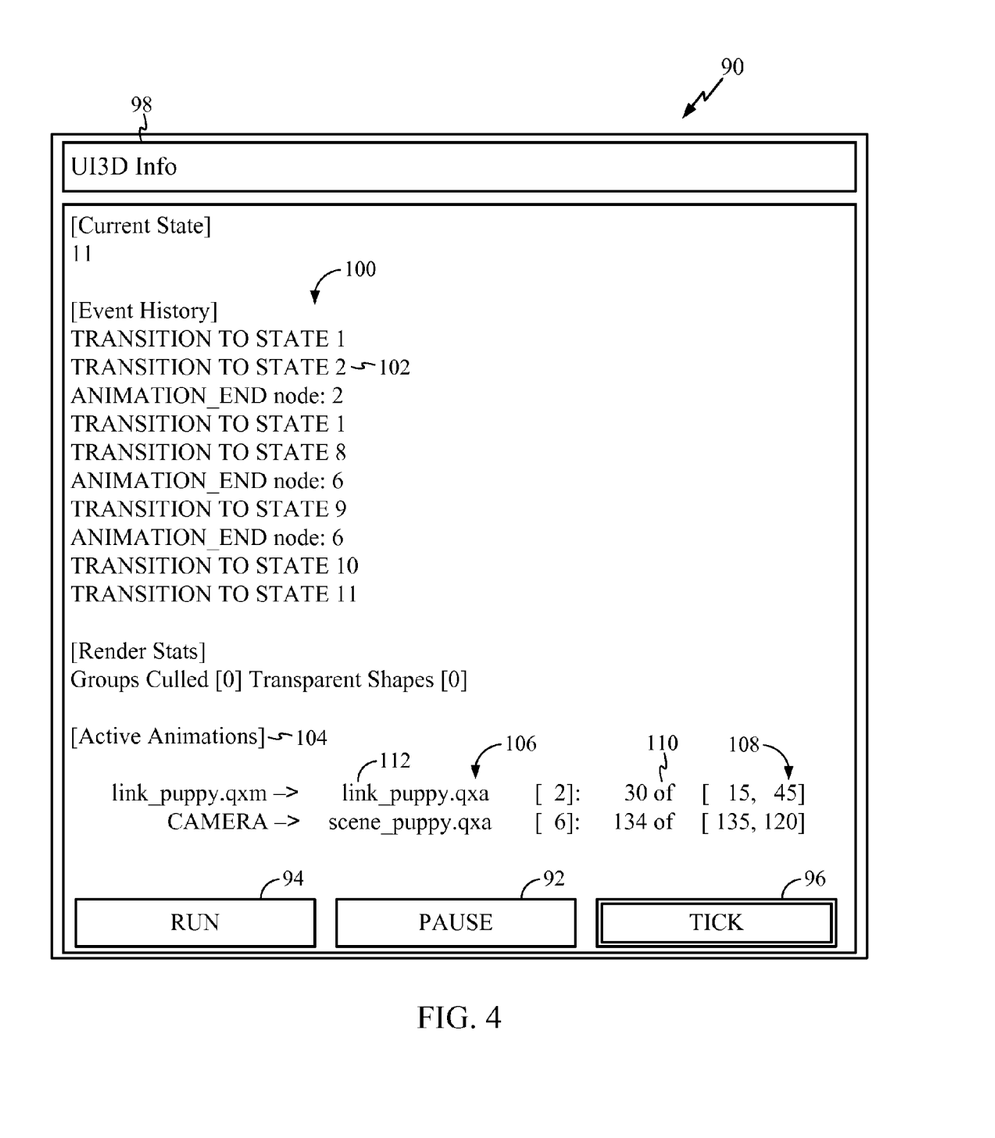
FIG. 4 is a diagram of an example of a screen shot of a status window of the illustrated debugging system.

FIG. 4 provides an example of a screen shot in accordance with one specific embodiment. The illustrated example screen shot 90 includes buttons towards the bottom of the screen for pause 92, play 94 and tick 96 controls. In addition, the illustrated screen 90 includes script identification information 98, event history information 100, and key press and device state information 102. In addition, information is provided regarding active animations 104. The active animations information 104 includes the current animation position, the total animation length, and the subset of the total animation length being run 106 describing each active animation. In this regard, the particular frame range 108 of the animation is depicted. The present frame 110 within that range, and a description for the animation 112, are also presented.

In embodiments herein, a scene is a type of 3D "world" that encapsulates a series of 3D elements. A scene defines a virtual environment, or space, in which 3D elements exist and may be situated and animated. That is, certain properties of an individual 3D element, such as its position and orientation, may be defined as relative to the scene in which the 3D element exists. In the illustrated embodiment, icons, cameras, lights and other 3D elements are each part of a scene. They may be part of a single scene, or of two or more separate scenes.

A scene may include nodes. In the illustrated embodiments, the scene includes nodes, each node being a point in the scene to which one or more objects are attached. A node acts as an abstract reference point, or origin, for the positions of its attached objects. The node may itself be animated, in which case any animation performed on a node is propagated to its attached objects. A model is a set of data that describes the appearance and behavior of objects within a scene. A model may constitute a single, independent scene object, or a model may comprise several objects. The data contained within the model may include geometrical data and surface or material properties. In the example shown in FIG. 3, a puppy is depicted fetching a ball. In this case, a single model encapsulates and describes the appearance of the puppy, the ball, and the surface on which the puppy is sitting, as well as a set of animations that can be applied to them. Mesh geometry can be drawn in various ways. It can be painted with a solid color, smoothly shaded between the colors at its vertices, or drawn with a texture map. Textures are the name for a specially-formatted image which is used to "drape" over the geometry represented by a model in order to give it a detailed surface. Textures are defined in texture files, in the illustrated embodiment Those textures are associated with the geometry they modify, for example, by the manner in which the name of file is specified. That is a texture file with the name "puppy.qxt" is associated with the model file "puppy.qxm".

Each scene may have at least one camera. The camera encapsulates the vantage point from which the scene is viewed. The camera itself is a scene object, and may be animated within the scene. A default camera (looking at the center of the world) may be provided for every scene, which is activated if no other camera is turned on.

A scene may have one or more lights. In addition, or alternatively, a scene may include default ambient "all-over" lighting. It is possible to bake lighting into vertex color and texture of a model to simulate static lighting in this ambient mode. Life-like dynamic lighting may be achieved by adding a light to a scene. A light is attached to a node, but in addition, it is associated with another node. That is, that association of the light to the other node defines the direction in which the light shines. Accordingly, a light can be pointed like a "flashlight". In addition, one may include parameters to define the color of the light that is shined into the scene.

One or more animation files may be provided, that describe how an object is animated. When an animation file is called upon, it is applied to a specific node within the scene. Animation files, in the illustrated embodiment, are a bit like a strip of film (or a timeline in flash), and contain a set of frames. These frames do not have to represent a continuous sequence, and can contain several completely different animations in the same frame "stack", which is why, in the illustrated embodiment, when they are called upon, both a start frame and an end frame are specified.

When an animation is activated, it is applied to a specific named node that it is meant to animate. By way of example, one animation file may be provided for animating a puppy, while a separate animation file is provided for animating the camera and light. The instructions specified in an animation file pass into the object attached to that node, and the object does whatever those particular frames tell it to do. For example, a puppy may spin on a spot, fly around the scene, or jump up and down.

A 4-way navigation key typically provided in a mobile device key board can be used to animate a puppy in various ways. For example, in this example as shown in FIG. 3, one may press the right nav key, causing the ball to roll off to the right, shortly followed by the chasing puppy that retrieves it.

The processing performed by each of the platforms shown in the figures herein may be performed by a general purpose computer alone or in connection with a specialized processing computer. Such processing may be performed by a single platform, or by a distributed processing platform, or by separate platforms. In addition, such processing can be implemented in the form of special purpose hardware, or in the form of software being run by a general purpose computer. Any data handled in such processing or created as a result of such processing can be stored in any type of memory. By way of example, such data may be stored in a temporary memory, such as in the RAM of a given computer system or subsystems. In addition, or in the alternative, such data may be stored in longer-term storage devices, for example, magnetic discs, rewritable optical discs, and so on. For purposes of the disclosure herein, computer-readable media may comprise any form of data storage mechanism, including such memory technologies as well as hardware or circuit representations of such structures and of such data. An integrated circuit may include one or more parts of the structure and processing disclosed herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example may arise from applicants/patentees, and others.

What is claimed is:

1. An apparatus for simulating a target embedded device, the apparatus comprising:
   a computer platform other than the target embedded device;
   an embedded device simulation engine executing on the computer platform to simulate the target embedded device;

an application run controller executing on the computer platform, wherein the application run controller is configured to:
  control execution of a 3D application authored for the target embedded device within the embedded device simulation engine;
  pause and resume execution of the 3D application; and
  single step the execution of the 3D application on at least one node in increments of script instructions, wherein the increments of script instructions correspond to individual consecutive frames of animation of at least one 3D object being displayed in a scene on a simulation screen, wherein the scene defines a 3D virtual space and comprises the at least one node to which the at least one 3D object is attached; and
a status provider executing on the computer platform and configured to provide, as the 3D application is executed within the embedded device simulation engine, information regarding a status of the at least one 3D object in the scene of the 3D application, of animations of the at least one 3D object in the 3D application, and of events occurring that affect the 3D application.

2. The apparatus according to claim 1, wherein the 3D application comprises a 3D user interface application.

3. The apparatus according to claim 1, wherein the application run controller includes a play control to cause the 3D application to be executed using the embedded device simulation engine.

4. The apparatus according to claim 3, wherein the application run controller includes a pause control to pause the 3D application as it is run in the embedded device simulation engine.

5. The apparatus according to claim 1, further comprising a status monitor to monitor the information regarding the status of the at least one 3D object in the scene of the 3D application and for each frame of animation of the at least one 3D object.

6. The apparatus according to claim 5, wherein the at least one 3D object being displayed in a scene on the simulation screen includes one or more lights, one or more 3D icons, one or more targeted directions of lights, one or more cameras, one or more targeted directions of cameras, a position of the at least one 3D object in the scene, information regarding whether the at least one 3D object is obstructed, whether the at least one 3D object has collided with an object, and whether the at least one 3D object is active or inactive.

7. The apparatus according to claim 6, wherein the status provider includes a display mechanism to display to a user via a computer screen the information regarding the status of the at least one 3D object.

8. The apparatus according to claim 7, wherein the display mechanism displays the information regarding the status of the at least one 3D object via a status window.

9. The apparatus according to claim 7, further comprising a fine-tune mechanism to fine-tune portions of the 3D application.

10. The apparatus according to claim 9, wherein the fine-tuned portions of the 3D application include defined animations of the 3D application.

11. The apparatus according to claim 10, wherein the fine-tuned portions of the 3D application further include defined interaction flow of the 3D application.

12. The apparatus according to claim 11, wherein the defined interaction flow includes defined interaction flow of the at least one 3D object being displayed in a scene.

13. The apparatus according to claim 1, wherein the status provider includes a display mechanism to display to the user via a computer screen the information regarding the status.

14. The apparatus according to claim 1, further comprising a fine-tune mechanism to fine-tune portions of the 3D application.

15. The apparatus of claim 1, wherein the status comprises at least one of a position of the at least one 3D object, whether the at least one 3D object is active or inactive, whether the at least one 3D object is obstructed, and whether the at least one 3D object has collided with an object.

16. A method for simulating a target embedded device, the method comprising:
  executing an embedded device simulation engine on a computer platform to simulate the target embedded device;
  executing an application run controller on the computer platform, wherein the application run controller is configured to:
    control execution of a 3D application authored for the target embedded device within the embedded device simulation engine;
    pause and resume execution of the 3D application; and
    single step the execution of the 3D application on at least one node in increments of script instructions, wherein the increments of script instructions correspond to individual consecutive frames of animation of at least one 3D object being displayed in a scene on a simulation screen, wherein the scene defines a 3D virtual space and comprises the at least one node to which the at least one 3D object is attached; and
  executing a status provider on the computer platform, wherein the status provider is configured to provide, as the 3D application is executed within the embedded device simulation engine, information regarding a status of the at least one 3D object in the scene of the 3D application, of animations of the at least one 3D object in the 3D application, and of events occurring that affect the 3D application.

17. A non-transitory computer-readable storage comprising instructions for simulating a target embedded device that, when executed, cause a processor to:
  execute an embedded device simulation engine on a computer platform to simulate the target embedded device;
  execute an application run controller on the computer platform, wherein the application run controller is configured to:
    control execution of a 3D application authored for the target embedded device within the embedded device simulation engine;
    pause and resume execution of the 3D application; and
    single step the execution of the 3D application on at least one node in increments of script instructions, wherein the increments of script instructions correspond to individual consecutive frames of animation of at least one 3D object being displayed in a scene on a simulation screen, wherein the scene defines a 3D virtual space and comprises the at least one node to which the at least one 3D object is attached; and
  execute a status provider on the computer platform, wherein the status provider is configured to provide, as the 3D application is executed within the embedded device simulation engine, information regarding a status of the at least one 3D object in the scene of the 3D application, of animations of the at least one 3D object in the 3D application, and of events occurring that affect the 3D application.

18. An apparatus for simulating a target embedded device on a computer platform other than the target embedded device, the apparatus comprising:

means for executing an embedded device simulation engine on a computer platform to simulate the target embedded device;
   means for executing an application run controller on the computer platform, wherein the application run controller is configured to:
      control execution of a 3D application authored for the target embedded device within the embedded device simulation engine;
      pause and resume execution of the 3D application; and
      single step the execution of the 3D application on at least one node in increments of script instructions, wherein the increments of script instructions correspond to individual consecutive frames of animation of at least one 3D object being displayed in a scene on a simulation screen, wherein the scene defines a 3D virtual space and comprises the at least one node to which the at least one 3D object is attached; and
   means for executing a status provider on the computer platform, wherein the status provider is configured to provide, as the 3D application is executed within the embedded device simulation engine, information regarding a status of the at least one 3D object in the scene of the 3D application, of animations of the at least one 3D object in the 3D application, and of events occurring that affect the 3D application.

* * * * *